(12) United States Patent
Mu-Tsai et al.

(10) Patent No.: US 6,946,216 B2
(45) Date of Patent: Sep. 20, 2005

(54) METHOD FOR ENHANCING BATTERY PERFORMANCE AND APPARATUS USING THE SAME

(75) Inventors: Chang Mu-Tsai, Taipei Hsien (TW); Tseng Tien-Chun, Taipei Hsien (TW); Li Hsiao-Feng, Taipei Hsien (TW); Chih-Feng Yeh, Taipei Hsien (TW)

(73) Assignees: Acer Incorporated, Taipei Hsien (TW); Wistron Corporation, Taipei Hsien (TW)

( * ) Notice: Subject to any disclaimer, the term of this patent is extended or adjusted under 35 U.S.C. 154(b) by 447 days.

(21) Appl. No.: 09/984,569

(22) Filed: Oct. 30, 2001

(65) Prior Publication Data

US 2002/0090546 A1 Jul. 11, 2002

(30) Foreign Application Priority Data

Jan. 6, 2001 (TW) .......................................... 90113308 A (51) Int. Cl.⁷ .............................................. H01M 10/50
(52) U.S. Cl. ......................................... 429/62; 429/120
(58) Field of Search .................................... 429/62, 120

(56) References Cited

U.S. PATENT DOCUMENTS

| | | | | |
|---|---|---|---|---|
| 3,525,386 A | * | 8/1970 | Grover | 429/120 X |
| 3,865,630 A | * | 2/1975 | Reimers | 429/120 X |
| 5,567,542 A | * | 10/1996 | Bae | 429/120 X |
| 5,599,636 A | * | 2/1997 | Braun | 429/62 X |
| 5,647,534 A | * | 7/1997 | Kelz et al. | 429/120 X |
| 5,834,131 A | * | 11/1998 | Lutz et al. | 429/62 X |
| 5,991,153 A | * | 11/1999 | Heady et al. | 361/704 |
| 6,075,699 A | * | 6/2000 | Rife | 361/704 |

FOREIGN PATENT DOCUMENTS

JP    2000-323186    * 11/2000    .......... H01M/10/50

* cited by examiner

Primary Examiner—Stephen J. Kalafut
(74) Attorney, Agent, or Firm—Bacon & Thomas, PLLC (57) ABSTRACT

Disclosed are method and apparatus for improving battery performance by transferring waste heat generated from heat generating components to the battery that, when brought to a high temperature, attains better performance according to temperature characteristics of the battery. According to the disclosure, an electronic device capable of effecting improved battery performance comprises a central processing unit generating waste heat when being operative; a battery for supplying power to said electronic device; and thermal conducting means, first end thereof making thermal contact with said central processing unit and second end thereof making thermal contact with said battery, causing heat transfer between said central processing unit and said battery. Said waste heat generated by said central processing unit is transferred to alter the temperature of said battery such that its output voltage is stabilized and capacity enlarged. Thermal pads can be disposed between said first end of said thermal conducting means and said electronic component, or between said second end of said thermal conducting means and said battery for increasing heat transfer rate. A fan can also be incorporated to cool the central processing unit.

12 Claims, 7 Drawing Sheets

METHOD FOR ENHANCING BATTERY PERFORMANCE AND APPARATUS USING THE SAME

REFERENCE TO RELATED APPLICATIONS

The present application claims priority to Taiwan application No. 090113308 entitled "Method for enhancing battery performance and apparatus using the same" filed on 1$^{st}$ Jun. 2001.

BACKGROUND OF THE INVENTION

1. Field of the Invention

The present invention relates to a method and apparatus for improving the electrical performance of a battery. More particularly, it relates to a method and apparatus for improving the discharge efficiency of a portable device battery.

2. Description of the Related Art

Batteries, or battery packs, are used to supply power to those devices such as PDA, notebook, and digital camera by converting chemical energy into electrical power, making thereby the portability possible. Though batteries for portable devices are compact and easy to use, they can only supply power for a limited period of time because their capacities are limited. Typically, a Li-ion or Li-polymer battery can supply power to a notebook only for several hours in normal operating condition. A battery with such a short operating duration restricts the portability of its device and is in conflict with the increasing need for better battery performance and longer operating duration. This is the background wherein the inventor of the present invention conceives the idea of improving the electrical performance of battery to be disclosed below.

A battery is an energy converting apparatus designed to transform chemical energy into electrical energy when discharging and to transform electrical energy back to chemical energy when recharged. Because chemical reactions are involved in the charge and discharge processes of the battery, its electrical characteristics will certainly be under the influence of the temperature of the surrounding environment and the temperature of the battery itself.

Figure 1:
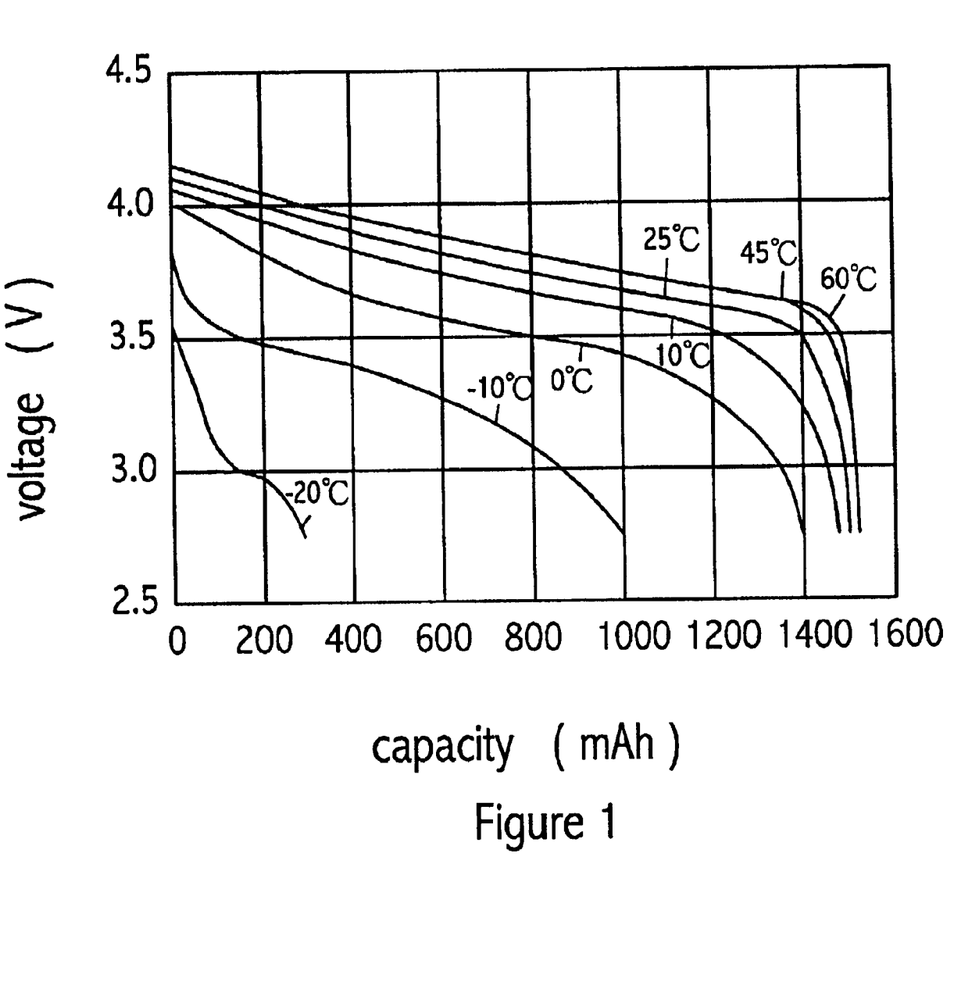
FIG. 1 illustrates the discharge temperature characteristics of a typical Li-polymer battery according to the prior art.
Figure 2:
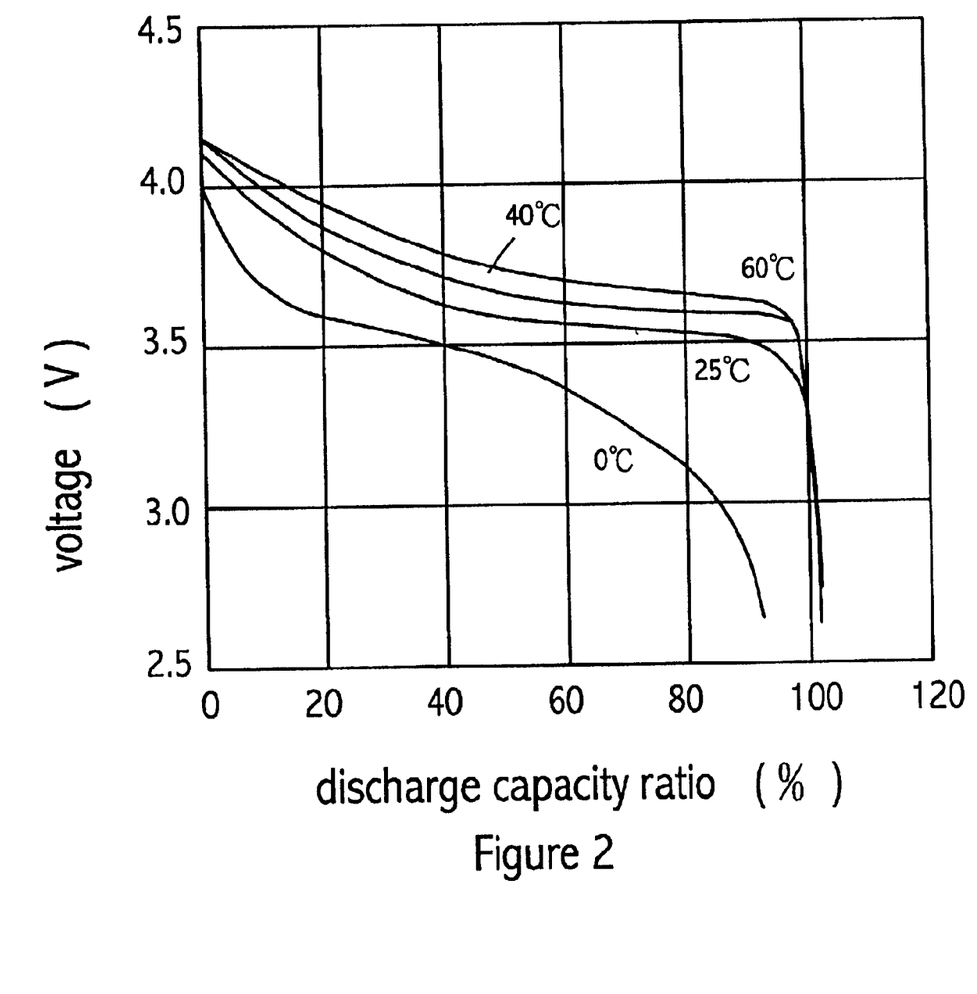
FIG. 2 illustrates the discharge temperature characteristics of a typical Li-ion battery according to the prior art.

FIG. 1 illustrates the discharge temperature characteristics of a typical Li-polymer battery, and FIG. 2 illustrates the discharge temperature characteristics of a typical Li-ion battery according to the prior art. Therein, one may discern that temperature has a positive effect on the discharging battery. That is, as temperature rises, the discharge voltage and the capacity (and capacity ratio) both rise. The phenomenon can be explained by the positive effect of temperature variations on the reaction constants of the chemical reactions involved in the discharge process as understood by one skilled in the art. One may also discern that as temperature rises, the slopes of the voltage-capacity curves decrease, suggesting that the discharge voltage variations decrease as temperature rises. By investigating FIG. 1 and FIG. 2, we conclude that a high operating temperature of a battery stabilizes its discharge voltage and increases its capacity, allowing the battery to supply power for a longer duration.

SUMMARY OF THE INVENTION

The fact that there exist positive correlations between the operating temperature of the battery and its discharge capacity and voltage indicates that a better electrical discharge performance can be obtained by raising the operating temperature of the battery. While it is known that a electrical device may comprise heat generating components such as a fast speed CPU or a LCD panel, the thermal energy generated by those heat sources can be directed to the battery of the device in accordance with the present invention so as to raise the operating temperature of the battery, thereby raising its discharge voltage and discharge capacity. In other words, unneeded and waste heat is utilized according to the present invention to heat up the battery to a higher operating temperature so that its discharge performance is enhanced.

Accordingly, the object of the present invention is to provide a method for enhancing the discharge performance of the battery for electronic devices, including stabilized discharge voltage and increased battery capacity and hence prolonged battery life. Software coding is avoided. Only hardware rearrangement is required.

Another object of the present invention is to provide an apparatus with improved battery performance by transferring waste heat generated from heat generating components to the battery that, when brought to a high temperature, attains better performance according to temperature characteristics of the battery.

Still another object of the present invention is to provide a method allowing one to make predictions concerning the operating conditions of a device of the present invention, arrange hardware relations, and to have the battery temperature fall within a desired range so that better battery performance is ensured according to temperature characteristics of the battery.

BRIEF DESCRIPTION OF THE DRAWINGS

The following detailed description, which is given by way of example, and not intended to limit the invention to the embodiments described herein, can best be understood in conjunction with the accompanying drawings, in which.

DETAILED DESCRIPTION OF THE INVENTION

What follows is a detailed description of different embodiments of the present invention for the purpose of fully disclosing the various features and improvements of the invention in conformity with patent law. The present invention relates to a method and apparatus using the method for improving the discharge performance of a battery. The present invention, whose applications should not be limited to the embodiments disclosed below, is particularly effective when applied to portable electronic devices such as PDA, notebook, web pad, and other mobile devices.

As described in the background of the invention, portable devices require batteries that supply power to the devices. Different devices may consume different amounts of electrical power, and many kinds of batteries have been developed that have met the various power demands. Popular batteries found on most portable devices are known to be NiMH battery, Li-polymer battery, and Li-ion battery.

By investigating FIG. 1 and FIG. 2, it is shown that a high operating temperature of a battery stabilizes its discharge voltage and increases its capacity. A battery with a stable discharge voltage allows its device to function properly, and a battery with an increased capacity lasts longer in supplying power to its device. In other words, a battery can attain a better discharge performance at a higher operating temperature. In view of the common characteristics of battery, the present invention improves the discharge performance of a battery by raising its operating temperature. In addition, the present invention allows one to adjust the operating temperature of the battery to an optimal value. It is understood by one skilled in the art that the applications of the present invention are not confined to the kinds of battery named above.

When an electronic device is in use, its various components such as CPU, integrated circuits, or display will generate thermal energy or heat due to the electrical currents flowing through them. Heat generated by these components is usually regarded as waste heat because it raises the temperature of the components themselves and also raises the temperature of all the other components of the device through thermal conduction and convection. High temperature has for most of the time negative effects on the functioning of the device, such as lowering the operating speed of the device, and is therefore to be avoided. For most devices the CPU is the major heat source and the faster the CPU speed is, the higher the CPU temperature will be. A high CPU temperature may cause system dysfunctions. Many solutions are readily available to circumvent the thermal problem. A fan can be incorporated into a notebook, for example, to convect away the waste heat. The waste heat can also be conducted to the metal housing of the notebook and thereby to be convected away by natural airflow around the notebook.

Instead of carrying away the waste heat out of an electronic device altogether, the present invention makes use of the waste heat by directing it into the battery of the device and thereby bringing higher the operating temperature of the battery. In this way, better discharge performance can be obtained. The waste heat turns out to be useful according to the present invention. In other words, the waste heat is recycled.

Figure 3:
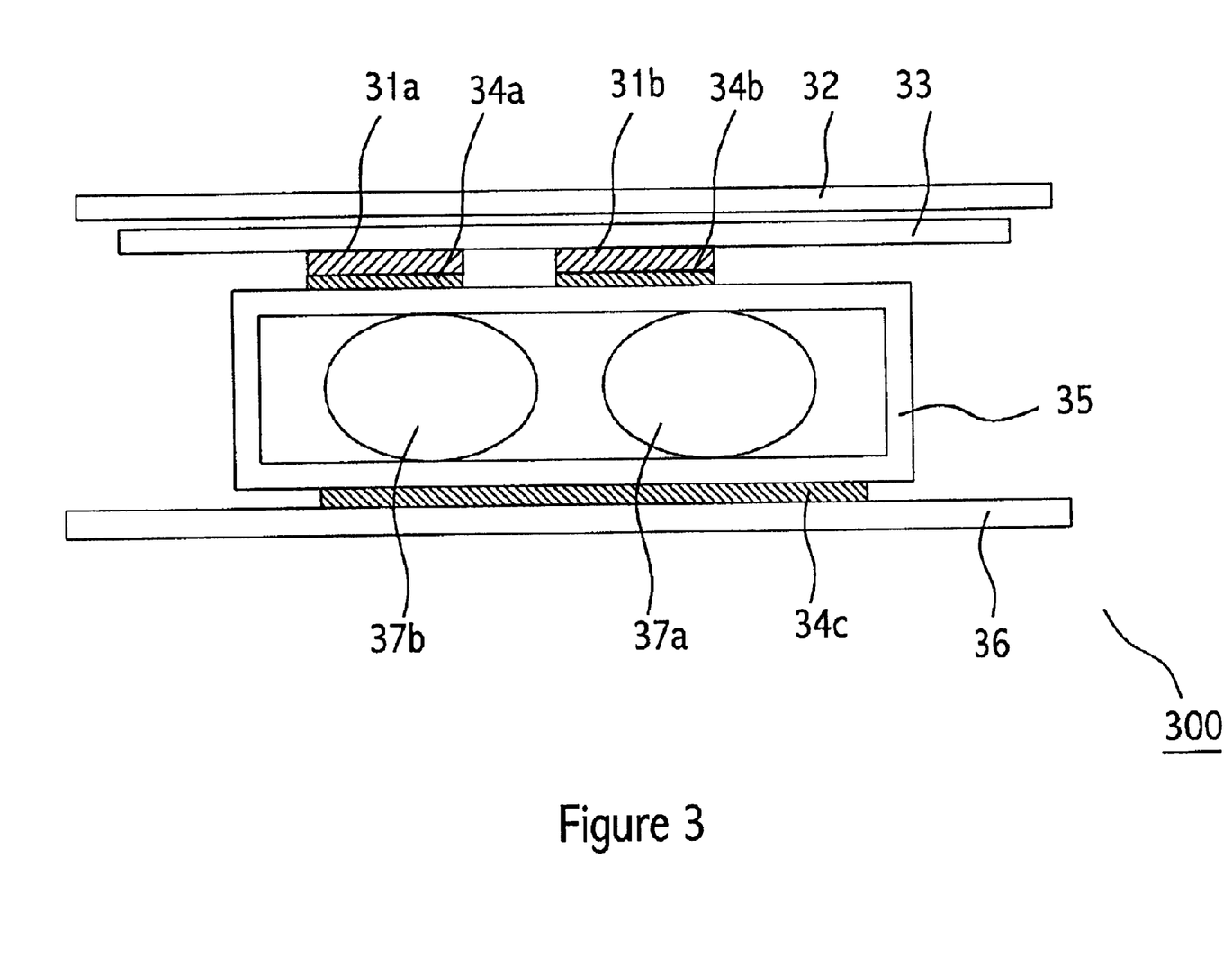
FIG. 3 illustrates one embodiment of the present invention wherein the thermal energy of the heat source is conducted to the batteries by direct contact.

FIG. 3 illustrates the cross-sectional view of a PDA as one embodiment of the present invention, wherein the thermal energy of the heat source is conducted to the batteries by direct contact. Within the PDA 300, a CPU 31a and related IC chip 31b, both mounted on printed circuit board 33, constitute the heat source of the system and will generate thermal energy that raises the temperature of the electronic components when operative. The CPU 31a operates at a frequency of 300 MHz that may in normal operating conditions bring the CPU temperature up to 70° C. Two batteries 37a, 37b, enclosed within an outer metal shell 35, are provided to supply electrical power to the PDA 300. The shell 35 is usually aluminium made.

The relative positions of the battery shell 35 and the heat generating source 31a,b are so arranged that the heat source makes direct contact with the battery shell 35, for the purpose of conducting waste heat from the heat source to the batteries 37a,b and raising thereby their operating temperature. Once the operating temperature of the batteries 37a,b is brought high, better discharge performance is obtained, as described above. In the case of CPU temperature being 70° C., the temperature of the batteries 37a,b can be raised to about 50° C. And when the battery temperature is raised, the CPU temperature is lowered, for waste heat is conducted away from, instead of concentrating in, the CPU 31a.

It is known to one skilled in the art that the CPU temperature and thereby the raised operating temperature of the batteries 37a,b are not fixed values. They are subject to variations due to different operating conditions of the PDA 300, and same CPU temperature can cause different temperature increments in batteries of different characteristics. In any case, the waste heat conducted to the batteries 37a,b will certainly bring their temperature higher than its normal value, resulting thereby better discharge performance. In the present embodiment, thermal conducting pad 34a,b are placed between the heat source 31a,b and the battery shell 35 to improve thermal conduction by reducing thermal resistances across the contact surfaces. The introduction of thermal pad 34a,b thus allows waste heat to be unobtrusively transferred to the batteries 37a,b such that the CPU temperature can be further lowered and battery temperature further raised.

In addition, another thermal pad 34c is placed between the battery shell 35 and the PDA housing 36 to have waste heat carried away from the PDA more efficiently. The thermal pad 34c has the effect of lowering the overall temperature of the PDA 300, including the CPU temperature and the battery temperature. As can be realized by one skilled in the art, by the introduction of thermal pads between heat source and battery shell on the one hand, and between battery shell and housing on the other, improved performance of the battery and better functioning of the system as a whole, including the CPU, can be obtained. It is also realized that, for a given CPU temperature and ambient temperature, one can decide, by experiment or theoretical calculation using conductivity coefficients of each components involved in the conduction process, what kind of batteries and thermal conducting pads are to be used so as to fit the battery temperature to the optimal value. Even under situations where the CPU temperature and ambient temperature are variable, one can still keep the battery temperature to fall within a desired range in which improved performance can be obtained. As shown in FIG. 1 and FIG. 2, the desired temperature range would be 40° C. to 60° C.

Figure 4:
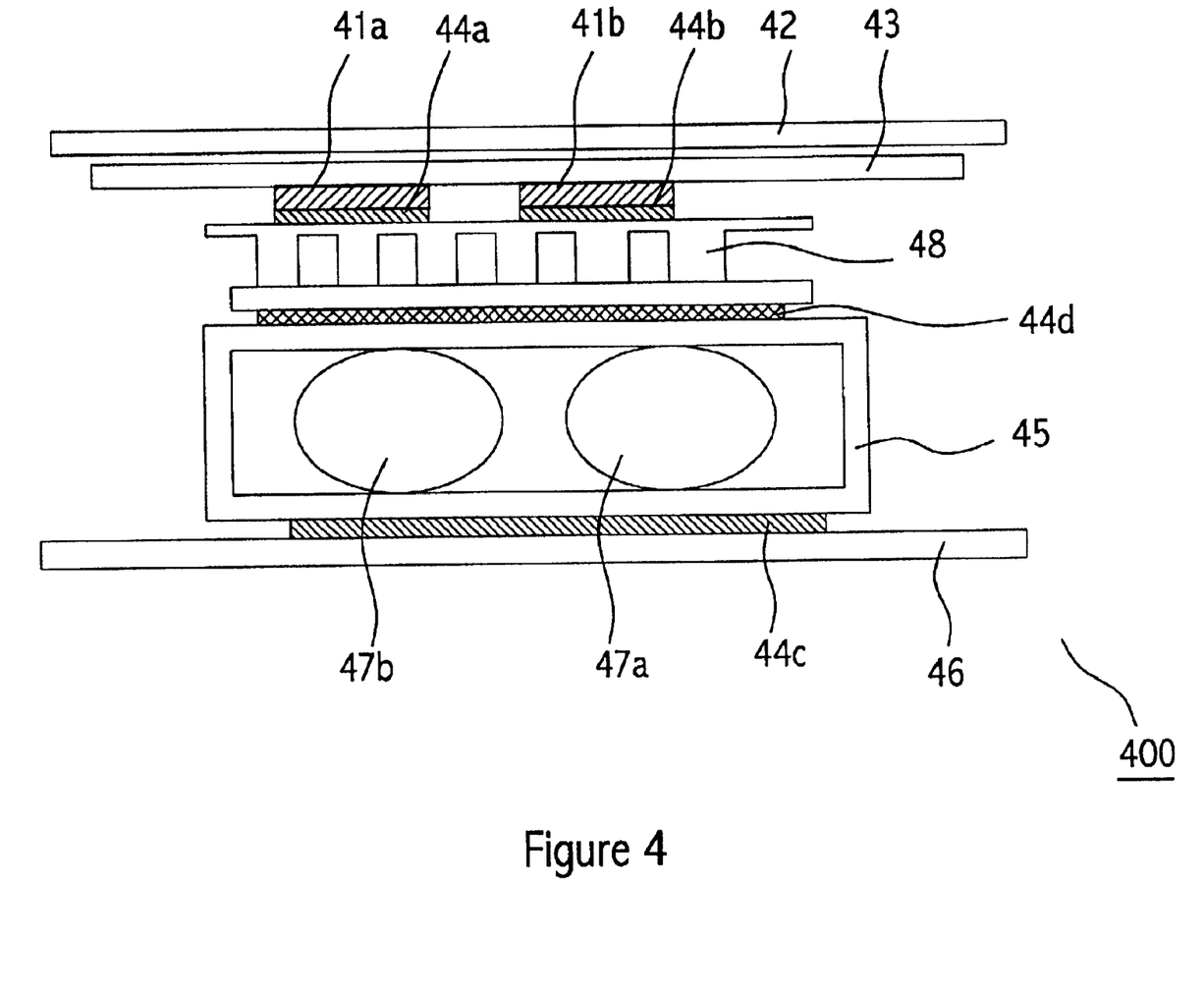
FIG. 4 illustrates one embodiment of the present invention wherein the thermal energy of the heat source is conducted to the batteries through a heat sink.

FIG. 4 illustrates the cross-sectional view of a webpad as one embodiment of the present invention wherein the thermal energy of the heat source is conducted to the batteries through a heat sink. In the present example, the relative positions of the heat source 41a,b, display 42, circuit board 43, the batteries 47a,b with outer shell 45 and the housing 46 of the web pad 400, are similar to those of the previous example except that transfer of waste heat from the heat source 41a,b to the battery shell 45 is brought about through a heat sink 48. A web pad CPU operates at a frequency of about 300 MHz to 550 MHz and generates thermal energy that requires effective conducting or convection means to carry it away. It is common in the art to attach a heat sink with a number of fins to a CPU of high temperature in order to spread out the thermal energy accumulated therein and to circumvent thereby any dysfunction that may result from high CPU temperature. In the web pad 400, the heat sink 48 is not only attached at one end to the heat source 41 *a,b* but also at the other end attached to the battery shell 45 to induce heat transfer from the heat source 41*a,b* to the battery is 47*a,b*. The heat sink 48 is thereby effective in cooling the heat source on the one hand by allowing waste heat to be convected away to the air as well as conducting waste heat from the heat source to the batteries 47*a,b*; on the other hand, it is also effective in raising the battery temperature as waste heat is transferred from the heat source to the batteries 47*a,b*. In this way, as the CPU temperature is dropped, the battery temperature is raised, and better battery performance is obtained.

It is possible, as in the PDA example, to introduce thermal pads 44*a,b,c,d* between conducting surfaces so that heat transfer is enhanced and adjusted with the result that the optimal battery temperature is maintained.

Figure 5:
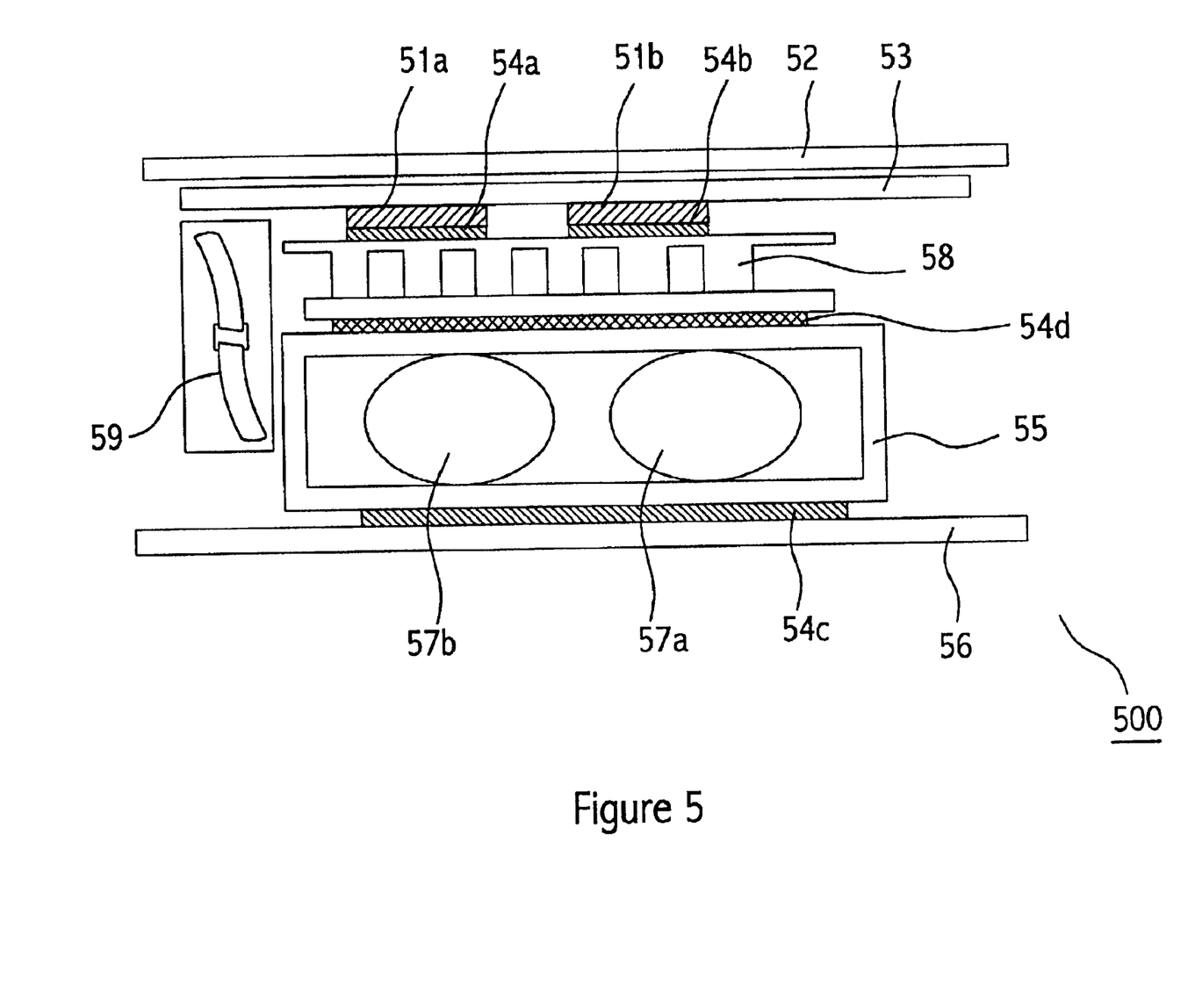
FIG. 5 illustrates one embodiment of the present invention wherein the thermal energy of the heat source is conducted to the batteries through a heat sink and is at the same time convected away by a fan.

FIG. 5 illustrates the cross-sectional view of a notebook as one embodiment of the present invention wherein the thermal energy of the heat source is conducted to the batteries through a heat sink and is at the same time convected away by a fan. In the present example, the relative positions of the heat source 51*a,b*, display 52, circuit board 53, batteries 57*a,b* with outer shell 55, heat sink 58, and the housing 56 of the notebook 500 are similar to those of the previous examples. For notebook 500 with CPU speed over 550 MHz, the CPU temperature may soar up even under normal operative situations because waste heat generated cannot be efficiently transferred away simply by attaching heat sink 58 to heat source 51*a,b* and by lowering the thermal resistances using thermal pads 54*a,b,c,d*. In such case, a fan 59 is installed to accelerate heat convection and prevent waste heat from adding up to an unacceptable level that may cause CPU dysfunctions. As understood in the prior art, convecting fans are widely utilized in notebooks that ensure that the CPU temperature does not go over an allowable value. In the present example, the fan 59 is utilized so that the battery temperature is raised into a desired range under the condition that the CPU temperature is maintained at tolerable values that will not induce system breakdown.

It is to be particularly noted that, for the present invention to work, it requires the CPU temperature, that is, the heat source temperature, to be higher than the battery temperature, which is usually the case. And a higher CPU temperature will naturally bring the battery temperature to a higher value. Yet it may happen that the fan 59 used to enhance heat transfer is still not able to carry waste heat away efficiently, and the CPU temperature of the notebook 500 soars up to such an extent that the battery temperature is also raised too high, that is, raised to a point that falls outside the desired range. Under such circumstances, the thermal pad 54*d* that is used in the previous examples to increase heat transfer rate may be replaced by a thermal insulating layer that decreases heat transfer, resulting in less waste heat to be transferred to batteries 57*a,b*, and thereby bringing the battery temperature down to the desired range. The above discussion exemplifies one advantage of the present invention that one is able to make the battery temperature fall within a desired temperature range and thereby obtain better battery performance by introducing dispensably into heat transfer between the heat source and batteries of an electronic device thermal conducting pads with low thermal resistances, as well as thermal insulating layers with high thermal resistances. It is up to the manufacturer to decide what kinds of material of what value of thermal resistance are to be used in order to make possible better battery discharge performance at a particular temperature range. For most cases, waste heat is of a small quantity and is not able to bring the battery temperature above the desired range, say, 60° C. for Li-polymer batteries, and therefore thermal pads with low resistance are utilized to enhance heat transfer in order to make as full use of the waste heat as possible. Yet in rare cases, waste heat is of so great a quantity that insulating means are needed to protect the battery by preventing it from operating at a rather high temperature.

For the three examples disclosed above, the batteries, heat transfer means, and the heat sources are organized in a bottom-up fashion. That is, the heat source, or CPU, is placed right above the batteries, and the heat transfer means, or heat sink if there is any, is placed right between the heat source and the batteries. Such superposition architecture would necessarily increase the width of the device, say, a notebook, and make it bulky and unappealing, especially when the size of the heat sink is huge and cannot be reduced for the heat sink to function efficiently. To avoid the problem according to the present invention, the batteries are to be shifted away from right below the heat source so that they do not overlap.

Figure 6:
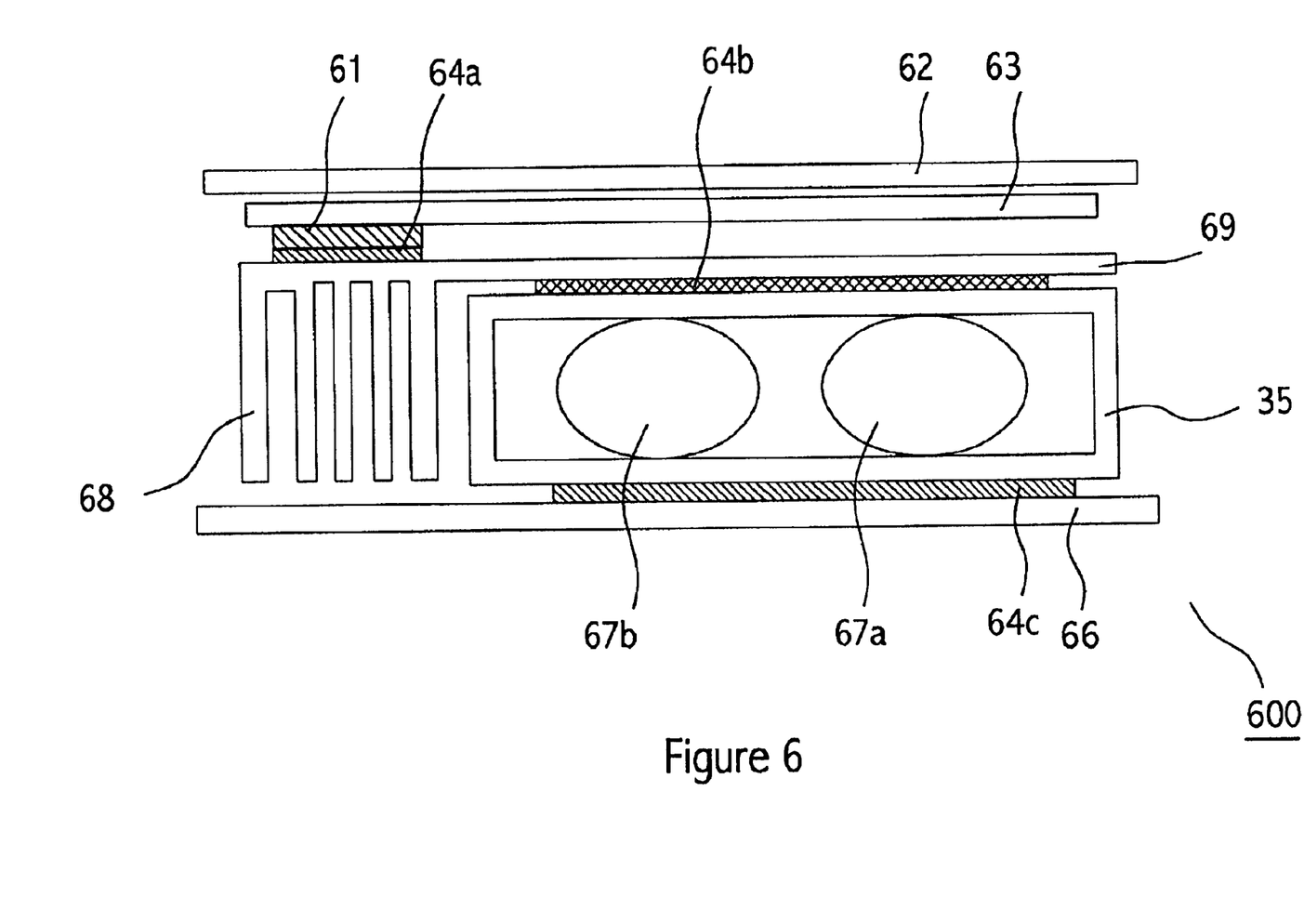
FIG. 6 illustrates one embodiment of the present invention wherein the thermal energy of the heat source is conducted to the batteries through a heat sink having an extending conducting plate.

FIG. 6 illustrates the cross-sectional view of a notebook with reduced width as one embodiment of the present invention wherein the thermal energy of the heat source is conducted to the batteries through a heat sink having an extending conducting plate 69. In the present example, the relative positions of the display 62, circuit board 63, thermal cads 64*a,b,c*, and the housing 66 of the notebook 600 are similar to those of the previous examples. In the example, batteries 67*a,b* with metal shell 65 are shifted away from right beneath the heat source 61 or CPU. The conducting plate 69 extending laterally from the heat sink 68 makes heat transfer possible from the CPU 61 to the batteries 67*a,b* by making contact with the upper surface of the metal shell 65, yet adds little to the width of the notebook 600. The plate 69 can be made as thin as possible without causing any significant increase in the width of the notebook 600. And it is anticipated by one skilled in the art that the heat sink 68 can be made and positioned so that it makes contact with the side surface of the metal shell 35, thereby minimizing the contribution made by the heat sink 68 to the total width.

Figure 7:
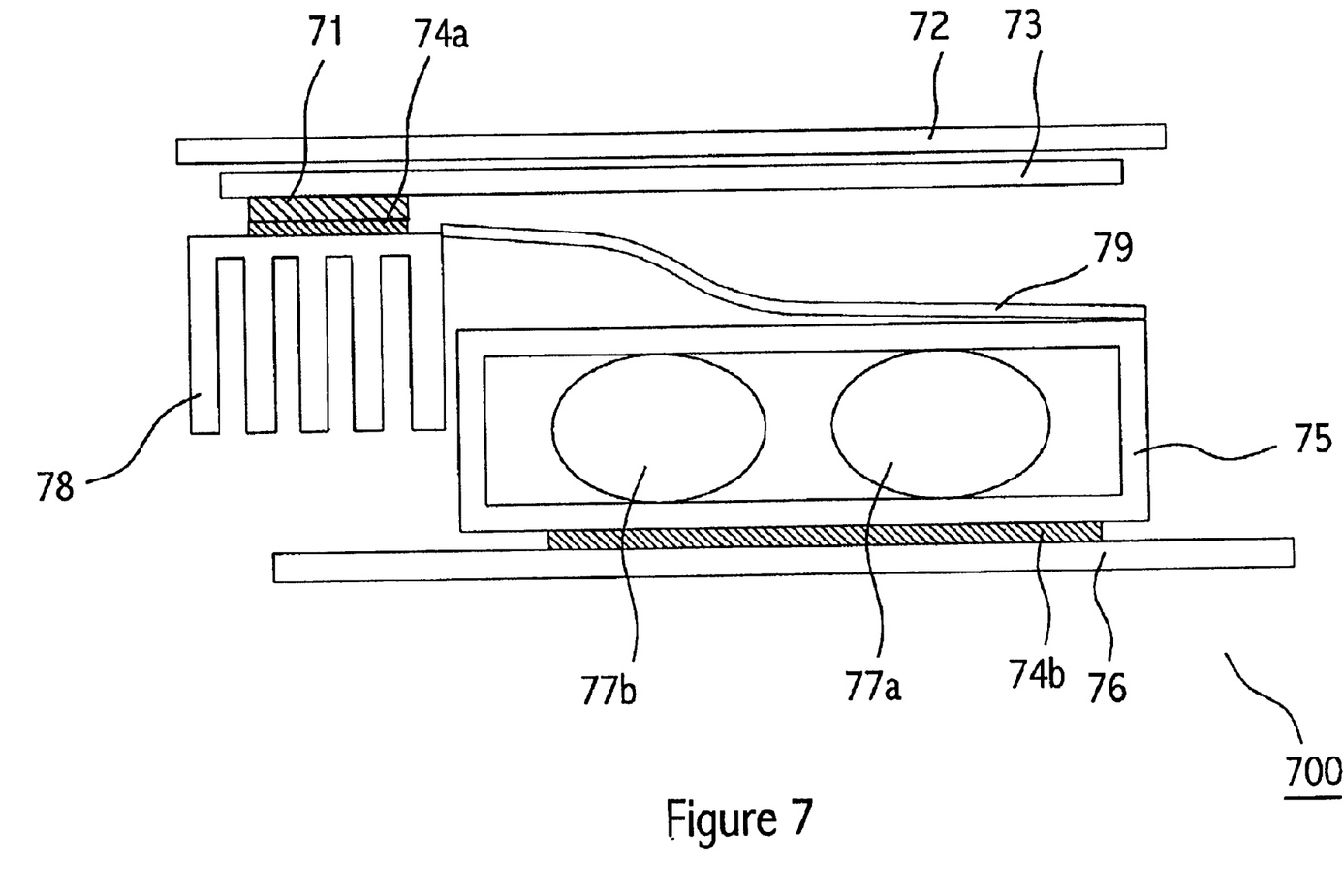
FIG. 7 illustrates one embodiment of the present invention wherein the thermal energy of the heat source is conducted to the batteries through a heat pipe.

FIG. 7 illustrates the cross-sectional view of a notebook as one embodiment of the present invention wherein the thermal energy of the heat source is conducted to the batteries through a heat pipe. In the present example, the relative positions of the display 72, circuit board 73, thermal pads 74*a,b* and the housing 76 of the notebook 700 are similar to those of the previous examples. In the example the CPU 71 is disposed with an offset with respect to the batteries 77*a,b*, and the heat transfer therebetween is brought about by a heat pipe 79. The heat pipe 79 has the same effect as that of the extending plate 79 of the previous example in reducing width, except that it takes more space to implement due to its hollow structure. It is also anticipated by one skilled in the art that the heat pipe 79 can be made and positioned so that it makes contact with the side surface of the metal shell 75, thereby minimizing its contribution to the total width of the notebook 700.

The present invention whose embodiments are disclosed above enables one, by transferring waste heat originated from CPU or other heat generating components of a electronic device to its batteries, to obtain better battery performance, including stabilized discharge voltage and increased battery capacity and hence prolonged battery life. It also enables one to make adjustments to the heat transfer process in advance based on the temperature characteristics of the batteries chosen and maintains the battery temperature at a desired range.

No software is involved in its implementation. It requires a new layout of the hardware architecture only and is therefore convenient and easy to implement into most computer devices. It is particularly suitable for, but not limited to, portable devices such as PDA, notebooks, and other mobile computers. Added cost is minor, and the space occupied is little and device size increased due to its implementation can be greatly reduced.

It is to be noted that the embodiments and particular features and functions as disclosed above are for the purpose of disclosure only and are not in any sense for limiting the scope of the invention. Small modifications and juxtapositions of one or more of the functional elements anticipated by those skilled in the art without departing the spirit of present invention is to be regarded as a part of the invention.

Therefore, that the scope of present invention is determined by the appended claims is fully understood.

What is claimed is:

1. A method for controlling temperature of a battery installed in an electronic device by utilizing waste heat generated by a heat source therein, wherein said heat source comprises a display apparatus that generates thermal energy when operating, comprising the steps of:

transferring said waste heat to said battery by thermal conduction, thereby bringing the temperature of said battery to a value at which the performance of said battery is enhanced;

varying thermal resistance relating to said conduction heat transfer to bring said temperature value to within a desired temperature range in which the performance of the battery is enhanced; and transferring said waste heat away by convection to lower the temperature of said heat source to within a desired temperature range, wherein said convection heat transfer is brought about by a fan.

2. The method according to claim 1, wherein said heat source comprises integrated circuits that generate thermal energy when operating.

3. A method for controlling temperature of a battery installed in an electronic device by utilizing waste heat generated by a heat source therein, wherein said heat source comprises a display apparatus that generates thermal energy when operating, comprising the step of:

transferring said waste heat to said battery by thermal conduction, thereby bringing the temperature of said battery to a value at which the performance of said battery is enhanced, wherein said conduction heat transfer is brought about by said heat source making direct thermal contact with said battery.

4. The method according to claim 1, wherein said transferring by thermal conduction is brought about by said heat source making thermal contact with said battery through a thermal conducting medium.

5. The method according to claim 1, wherein said varying thermal resistance relating to said conduction heat transfer is brought about by varying thermal resistance between conducting surfaces causing said conduction heat transfer.

6. The method according to claim 3, wherein said heat source comprises integrated circuits that generate thermal energy when operating.

7. An electronic device capable of effecting improved battery performance, comprising:

an electronic component generating waste heat when operating;

a battery for supplying power to said electronic device;

thermal conducting means, a first end thereof making thermal contact with said electronic component and a second end thereof making thermal contact with said battery, causing heat transfer between said electronic component and said battery; and heat convecting means for altering the temperature of said electronic component, wherein said waste heat generated by said electronic component is transferred to alter the temperature of said battery such that improved battery performance is effected.

8. The electronic device according to claim 7, which further comprises conduction enhancing means for increasing heat transfer rate, disposed between said first end of said thermal conducting means and said electronic component, or between said second end of said thermal conducting means and said battery.

9. The electronic device according to claim 7, wherein said electronic component is displaced without being superposed upon said battery such that said electronic device is made compact.

10. The electronic device according to claim 7, or claim 9, wherein said thermal conducting means comprises a heat pipe forming said second end thereof that makes thermal contact with said battery.

11. The electronic device according to claim 7 or claim 9, wherein said thermal conducting means comprises a heat sink with a number of fins and a conducting plate extending laterally therefrom to form said second end thereof that makes thermal contact with said battery.

12. The electronic device according to claim 7, wherein said electronic component is a central processing unit of said electronic device.

* * * * *